(12) United States Patent
Fu et al.

(10) Patent No.: US 7,265,867 B2
(45) Date of Patent: Sep. 4, 2007

(54) PRINTER DRIVER SYSTEM FOR REMOTE PRINTING

(75) Inventors: Arron Fu, Toronto (CA); Tamer Ahmed Afify, Toronto (CA); William Martin Sloan, Toronto (CA)

(73) Assignee: Bell Business Solutions Inc., Montreal, Quebec (CA)

( * ) Notice: Subject to any disclaimer, the term of this patent is extended or adjusted under 35 U.S.C. 154(b) by 121 days.

(21) Appl. No.: 11/312,747

(22) Filed: Dec. 21, 2005

(65) Prior Publication Data

US 2006/0092469 A1    May 4, 2006

Related U.S. Application Data

(63) Continuation of application No. 09/802,240, filed on Mar. 8, 2001, now Pat. No. 7,064,856.

(30) Foreign Application Priority Data

Aug. 4, 2000    (CA) .................................. 2315270

(51) Int. Cl.
*G06K 15/00* (2006.01)
*G06F 3/12* (2006.01)

(52) U.S. Cl. .................................... 358/1.18; 358/1.15

(58) Field of Classification Search ................. 358/1.1, 358/1.9, 1.15, 1.18, 403; 709/101, 223, 228, 709/232, 319; 710/7, 8, 9, 19, 33
See application file for complete search history.

(56) References Cited

U.S. PATENT DOCUMENTS

| 5,128,878 A | 7/1992 | Gore et al. |
| 5,303,336 A | 4/1994 | Kageyama et al. |
| 5,602,974 A | 2/1997 | Shaw et al. |
| 5,754,747 A | 5/1998 | Reilly et al. |
| 5,845,058 A | 12/1998 | Shaw et al. |
| 5,859,623 A | 1/1999 | Meyn et al. |
| 6,092,104 A | 7/2000 | Kelly |

(Continued)

FOREIGN PATENT DOCUMENTS

CA    2 100 178    1/1994

(Continued)

OTHER PUBLICATIONS

Tim Bienz et al., Portable Document Format Reference Manual, Version 1.2, Adobe Systems Incorporated, Nov. 27, 1996, pp. 1 to 394.

(Continued)

*Primary Examiner*—Douglas Q. Tran (57) ABSTRACT

According to embodiments of the present invention, an apparatus method and system of remote printing is provided. A server connected to a client via a network is operable to host execution of an application for a client, to receive the user-input from the client via the network, and to send user-output to the client via the network. The server receives a print request from the client, which is included in the user-input. The server then generates a universal printer file from the application, based on the print request, and transmits the universal printer file to an electronic mail system for delivery of the universal printer file to a destination specified by the client, for example as an attachment to an email message.

21 Claims, 5 Drawing Sheets

U.S. PATENT DOCUMENTS

| | | |
|---|---|---|
| 6,201,611 B1 | 3/2001 | Carter et al. |
| 6,369,909 B1 | 4/2002 | Shima |
| 6,560,621 B2 | 5/2003 | Barile |
| 6,661,526 B1 | 12/2003 | Daly et al. |
| 6,757,070 B1 | 6/2004 | Lin et al. |
| 6,763,396 B2 | 7/2004 | Torikai |
| 6,919,966 B2 | 7/2005 | Nguyen et al. |
| 6,952,831 B1 | 10/2005 | Moore |

FOREIGN PATENT DOCUMENTS

| | | |
|---|---|---|
| EP | 0 847 002 A1 | 10/1998 |
| EP | 0 903 691 A2 | 3/1999 |
| EP | 1 006 432 A2 | 7/2000 |
| EP | 1 178 392 A3 | 11/2005 |

OTHER PUBLICATIONS

Jim Meehan et al., PDF Reference, second edition, Adobe Portable Document Format, Version 1.3, Adobe Systems Incorporated, Jul. 2000, pp. 1 to 679.

Derek J. Rice, ICA Client Printer Creation, Technical Support, Citrix Systems, Inc., Version 1.0, Oct. 5, 2000, pp. i to 19.

PRINTER DRIVER SYSTEM FOR REMOTE PRINTING

CROSS-REFERENCE TO RELATED APPLICATION

The present application is a continuation, and claims the benefit under 35 U.S.C. §120, of prior filed U.S. patent application Ser. No. 09/802,240 to Fu et al., filed on Mar. 8, 2001 now U.S. Pat. No. 7,064,856, hereby incorporated by reference herein.

FIELD OF THE INVENTION

The present invention generally relates to a printer driver system, and more particularly, the invention relates to a printing process processed and executed on servers in the client-server computer environment.

BACKGROUND OF THE INVENTION

In the client-server environment, the server operating system is called upon to handle communication interaction with a variety of client-based applications. The client operating system locates a server and requests a connection with the server and the server allocates resources to handle requests from the client. This can include, for example, a print request to a designated printer connected locally or to the client.

Examples of such clients include workstations, desktop computers, laptops, hand held devices and the like. Examples of printer devices include laser printers, bubblejet printers, inkjet printers, multi-purpose machines which combine printing, faxing and/or photocopying capabilities, and the like.

In some client-server systems, however, the client computer is a simple machine that is implemented with less functionality than a general-purpose computer. For instance, the client might be implemented as a terminal, which typically provides just enough functionality to enable access to the server computer over a network. The terminal has no operating system or "intelligence"; rather, the operating system and applications reside at the server, and the processing takes place at the server.

More recently, low cost computers known as "network computers" or "NCs" have been introduced as a means for providing access to a network. Network computers have a display, a keyboard, a network port, and limited processing capabilities. Network computers can provide some limited local processing, but are primarily reliant on the server for most processing. Presently available network computers are primarily configured to run applications written in Java, a language introduced by Sun Microsystems. Closely related to the NCs is another type of low cost computer, known as "Net PCs", which can run both Windows-based and Java-based applications, but which operate in a similar manner to an NC.

Various technologies, and in particular, a technology marketed under the name "MetaFrame" from Citrix Systems Inc., extend the typical Windows NT server operating system to support multiple client-server windowing sessions for connected clients, where each session provides a windowing environment for the connected client.

With the MetaFrame technology, for example, a client can connect to the Windows NT server and begin a windowing session. To the user, it appears as if the client is a standalone Window-enabled computer that is running its own Windows-brand operating system. However, the session is actually taking place on the server computer, remote from the client, and the client is merely running a local graphical user interface to provide entry to the session. In this regard, the MetaFrame technology is particularly well suited for low intelligent client computers, such as terminals and network-centric computers, because the client need not be capable of running its own operating system. However, the MetaFrame technology is also equally well suited for fully enabled clients.

A server operating system supports multiple client-server sessions and enables each client to work with applications hosted by the server and create and print work to local printers (connected to the server) or remote printers (connected to, for example, the client). It should be noted that an essential component of current client-server printer applications is that the host server must be able to support each of the numerous printers which might be selected. This is usually accomplished by installing the relevant printer driver on the host server.

However, issues evolving from the installation of printer drivers on the host server include the volume of printer devices on the market, the stability of the printer drivers for some devices, the reliability of the server after the installation of numerous printer drivers, and naming conventions of drivers among different operating systems.

A common problem with, for example, the Citrix MetaFrame technology, therefore, is the ability to print to any remote printer device. Another problem with Citrix MetaFrame technology is the bandwidth usage taken by the server when processing a print job to a remote printer since bandwidth and speed are also issues that the host server must deal with when processing remote print jobs.

To exemplify the problem, consider a common scenario. A user logs onto the Windows NT server from a client computer at the user's home. Connected to the user's computer is a multi-purpose printer/fax machine. The user works on a document using word-processing software hosted by the server. The user then wants to print the work to the printer/fax machine connected to the home computer. The print job is processed by the server but it cannot be sent to the user's local printing device because the device is not recognized or supported by the server's operating system or because the printing job requires more bandwidth than is available to send the print job across the connection.

The server must also recognize the type of printer/fax machine and send the print job to it in a recognizable form. The bandwidth available to the server-client must also be sufficient enough to allow for the speedy transfer of the file information.

A similar scenario would be a user that is connected to the host server through a terminal.

It should be noted that printers have their own "language". When work is sent to a printer, the content of the document is transformed to a format that a printer can recognize, interpret and print out. The most common formats are formats developed by Hewlett Packard, Epson and Post-Script. Conversion of the work to a printer format is generally accomplished by the use of a driver which driver is particular to an individual machine and operating system.

This means that for each printing device and operating system, a driver must be installed on the host server in order for it to process print jobs to that printing device. It also means that the file created by the server and sent to the printer can vary in size depending on the type of printer. However, these printer files are typically quite large in nature, and thus generally require significant amounts of bandwidth in order to print at a reasonable speed. Also, due to their large size, the transmission speed of transferring the printer file from the server to the client's printer, can significantly affect the speed at which the print job is completed.

Thus, in summary, a common problem in remote printing is that the printer file is large and, accordingly, requires a large bandwidth to transfer the print job. A second problem is that the server must contain the printer driver files for all printers which may be connected to the computer systems of the remote user. A third problem is that the server must remain stable and reliable when dealing with a wide variety of different printer drivers.

While existing systems have met with some success, there is a desire to improve the printing system to better overcome these problems and to better focus on the needs of the user. In particular, there is a need to overcome these problems in order to reduce the bandwidth load, and to reduce the need for a large number of printer drivers to be stored on the host server.

SUMMARY OF THE INVENTION

A first broad aspect of the invention seeks to provide a server for connection to a client via a network, the client being operable to transmit user-input to the server over the network and to receive user-output from the server over the network. The server includes a network interface for connection to said network. The server further includes a processor coupled to the interface, the processor being operable to remotely host execution of an application for the client, the application being operable to receive user-input from the client over the network. The application is also operable to generate the user-output for transmission to the client over the network. The processor is further operable to generate a universal printer file from the application based on a print request embedded in the user-input. The processor is further operable to transmit the universal printer file to an electronic mail system for delivery of the universal printer file to a destination specified by the client.

In some embodiments of the first broad aspect, delivery of the universal printer file to the destination includes delivery of the universal printer file as an attachment to an email message.

In some embodiments of the first broad aspect, the universal printer file is generated according to the Adobe Acrobat portable document format ("PDF").

In some embodiments of the first broad aspect, the network includes at least one of a local area network, a wide area network and the Internet.

In some embodiments of the first broad aspect, the universal printer file is transmitted to the destination for printing at a printer locally connected to the destination, the destination being operable to interpret the universal printer file for the printer via a universal print file reader in cooperation with a local printer driver complementary to the printer. In further embodiments the universal printer file is generated according to the Adobe Acrobat portable document format ("PDF"). In some implementations, the universal print file reader is Adobe Acrobat Reader.

A second broad aspect of the present invention seeks to provide a client-server computer system. The client-server computer system includes a client operable to transmit user-input over a network and to receive user-output over said network. The client-server computer system further includes a server connected to the client via the network, the server being operable to remotely host execution of an application for the client. The application is operable to receive user-input from the client over the network, and to generate the user-output for transmission to the client over the network. The server is further operable to: (I) generate a universal printer file from the application based on a print request embedded in the user-input; and (II) communicate with an electronic mail system for delivery of the universal printer file to a destination specified by the client. The destination is operable to receive the universal printer file. The destination includes a universal print file reader operable to interpret the universal printer file into a local printer file in cooperation with a local printer driver. The destination further includes a printer complementary to the local printer driver for connection to the destination, the printer being operable to print a document from the local printer file.

In some embodiment of the second broad aspect, delivery of the universal printer file to the destination includes delivery of the universal printer file as an attachment to an email message. In some implementations the print request is transmitted over a wireless connection. In other implementations the client is also the destination. In further embodiments the universal printer file is generated according to the Adobe Acrobat portable document format ("PDF"). In yet further embodiments the network includes at least one of a local area network, a wide area network and the Internet.

In some implementations of the second embodiment, the server is a host server, and the client-server computer system further includes an email server connected to the host server, the email server being operable to accept the universal printer file from the host server and to transmit an email message containing the universal printer file to the destination.

A third broad aspect of the present invention seeks to provide a method of printing. The first step of the method comprises receiving a print request at a server from a client remotely connected to the server via a network. The second step of the method comprises processing the print request at the server by corresponding the print request to an application hosted on the server on behalf of the client. The third step of the method comprises locating a universal printer driver on the server. The fourth step of the method comprises creating a universal printer file from said application using the universal printer driver. The fourth step of the method comprises sending an email message containing the universal printer file to a destination specified by the client.

In some embodiments of the third broad aspect the method the universal printer file is generated according to the Adobe Acrobat portable document format ("PDF").

In other embodiments of the third broad aspect the network includes at least one of a local area network, a wide area network and the Internet.

In further embodiments of the third broad aspect the sending step includes transmitting the universal printer file to the destination and the method further comprises the steps of: receiving the universal printer file at the destination; interpreting the universal printer file for a printer in communication with the destination; and printing the interpreted universal printer file at the printer. In some implementations, the destination is the client.

In further embodiments of the third broad aspect the universal printer file is generated according to the Adobe Acrobat portable document format ("PDF").

In further embodiments of the third broad aspect the sending step includes transmitting the universal printer file to an e-mail server, and said method further includes the steps of: creating the e-mail message at the e-mail server; attaching the universal printer file to the e-mail message; and transmitting the e-mail message and attached universal printer file from the e-mail server to the destination.

Other features of the present invention, as well as other advantages attendant thereto, will be apparent from the following description and the accompanying drawings in which like reference numerals depict like elements.

BRIEF DESCRIPTION OF THE DRAWINGS

Embodiments of the present invention will now be described by reference to the following drawings wherein.

DETAILED DESCRIPTION OF EMBODIMENTS

A printer file is relatively large due to the fact that the content and the page format settings must be transmitted to the printer in a printer language understood by the printer. A function of a universal printer driver is that it is able to compress the printer file into a smaller file which can be transmitted over the network connection (or Internet connections) more rapidly than the original, larger printer file.

Although any level of compression is generally of some assistance in increasing transmission speed and reducing bandwidth, it is preferred that the universal printer driver compress the printer file to a file size which is less than 95%, preferably less than 90%, and more preferably, less than 75% of its original size. Even more preferably, the universal printer driver will compress the printer file to a file size which is less than 50% of its original size.

The universal printer driver is preferably a commonly available program but may also be a proprietary program developed for this application. One commonly available program is available under the trade mark of Adobe Acrobat. Through Adobe Acrobat, a universal printer driver and a universal print file reader are available which can compress a printer file into a "pdf" printer format file for transmission across the network connection, and convert the "pdf" file into a file suitable for printing. The universal print file reader is generally a related product to the universal printer driver.

It should be noted that traditional printer drivers are generally dependent on the operating system under which the computer is operating. Thus, situations can occur wherein, for example, a host server running on Windows NT or Windows 2000 while the local remote client computer is running Windows 95 or 98, and the printer used on the client computer only has printer drivers for Windows 95 or 98. In this situation, even if the printer drivers are installed on the server, the server won't recognize them or support them. In this case, it can be difficult to manage to print to the remote client printer.

In contrast, a universal printer driver is typically one in which the driver is not dependent on the operating system, and can prepare a printer file which can be transmitted to any number of different operating systems.

Further, the universal printer driver can create a file which can be sent to a variety of machines such as computers running Windows operating systems, Apple computers, VAX computers, computers running under a UNIX operating system, thin-client configurations, Network PCs, NCs, PDAs and a variety of other client computer arrangements. Thus, the print driver is universal in that it creates a print file which can be used by almost all commonly available computer makes, models or operating systems.

The present invention is of use in any situation where a remote client is connected to a client-server arrangement. This includes various networked or Internet connections. Of most interest in the present invention however, is an application wherein the universal printer driver is installed on a server running Citrix MetaFrame. Accordingly, the host server may be anyone of a variety of machines capable of acting as a server, but most preferably is a host server capable of running Citrix MetaFrame.

The printer server system generally will comprise a local remote computer which will be directly connected to the printer. However, the printer server system might also comprise a separate computerized system for converting the "pdf" file into a printer file and then sending it directly to the printer without passing through the local, remote computer.

Similarly, the printer file generated by the host server may be converted to the compressed transmittable file in the host server directly. However, the printer file may be sent to a separate computerized system for conversion, before the compressed transmittable file is sent to the remote client computer.

The compressed transmittable file is normally sent directly to the printer server system directly. However, in an alternative embodiment, the compressed transmittable file may be sent to an electronic mail system of the host server, and sent to the client as an e-mail file. The e-mail file can then be printed as normal.

Figure 1:
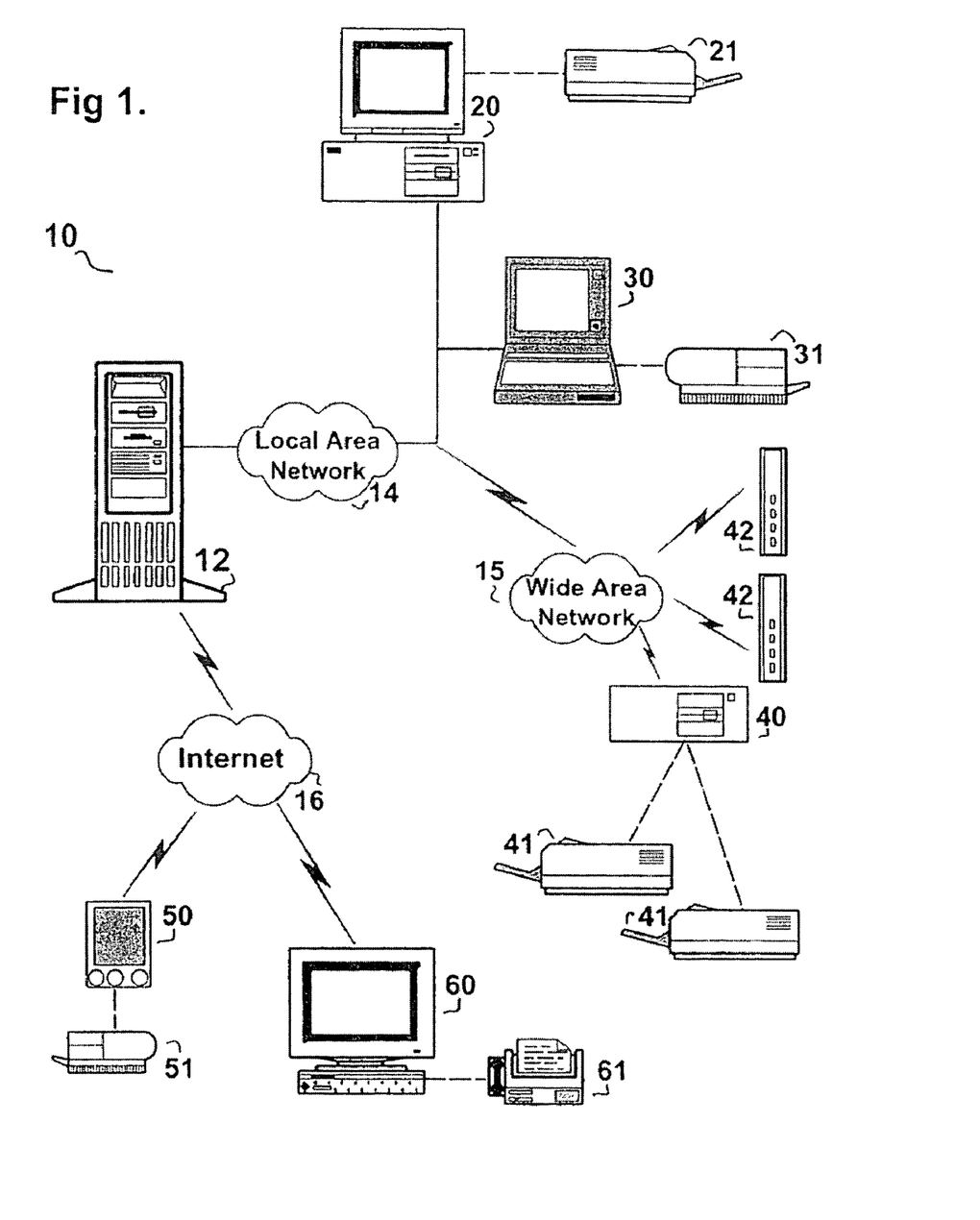
FIG. 1 is an illustration of a client-server computer system showing printing devices connected to the client computer.

FIG. 1 is an illustration of a client-server computer system, generally depicted as 10, showing printing devices connected to the client computer. In particular, host server 12 is shown having three connection points, namely via a local area network (LAN) 14, via a wide area network (WAN) 15, or via the Internet 16. Connected to LAN network 14 are a plurality of client computers, of which two are shown, namely a desktop PC 20, a laptop PC 30. Each client computer has an attached printer designated as 21 and 31.

Two "thin client" access terminals, generally designated as 42, and a print server 40, are shown as being connected to WAN network 15. Connected to print server 40 are two printers generally designated as 41.

Connected to Internet 16 are a plurality of client computers, of which two are shown, namely a handheld PC 50 (such as a PDA (personal digital assistant) including those sold under the trade name PalmPilot, or e-mail tools such as BlackBerry, or other devices running under Windows CE) and a remote client PC 60. Connected to the client computer systems are printers 51 and 61.

Although variations are possible, this represents a standard configuration for a client-server computer arrangement, and in particular, for a client-server computer arrangement wherein the host server is running a program such as Citrix MetaFrame wherein the remote PC, or the like, is used merely as a terminal to access and use various programs on the host server, and where the host server is used for processing various functions in place of the remote PC.

Figure 2:
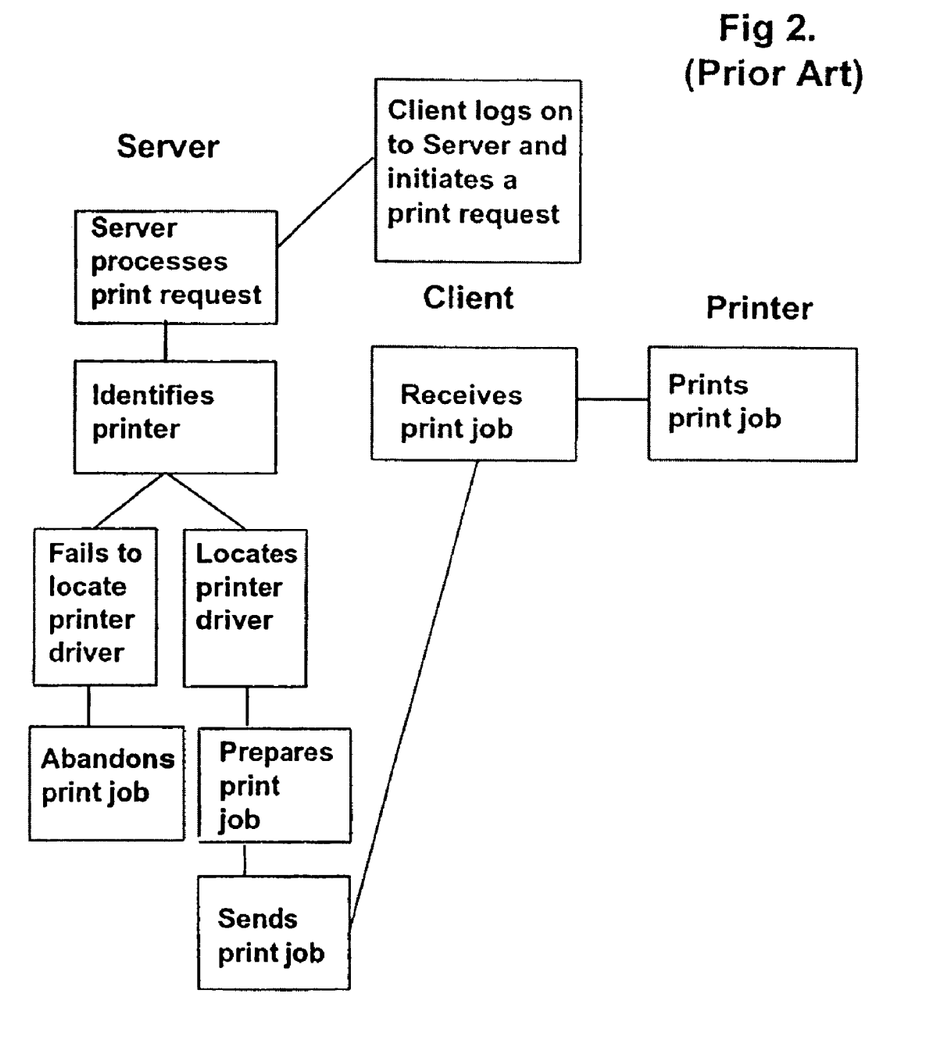
FIG. 2 is a flow chart of a print job being processed on a client-server computer system according to the prior art.

In FIG. 2, a flow chart of a print job being processed on a client-server computer system of FIG. 1, according to the prior art, is shown. In this example, the user of desktop PC 20 wishes to print a document to PC 21, the flow chart of the actions taken would be as shown in FIG. 2. Initially, the user makes a request for a file to be printed and requests that the file be printed to printer 21. The file is a 15 page document with text and graphics with a size of 142 KB. Server 12 receives the print request, identifies printer 21 and locates the correct driver for printer 21. If the server fails to find the correct driver for the printer, then the print job is abandoned. Only if the correct driver is found, is the print job continued. Using the correct driver, host server 12 prepares a printer file which is then sent to PC 20 over the network connection 14. The printer file for the 15 page document is now 6287 KB in size, and thus creates a large file to be transferred to PC 20. The printer file is then forwarded to printer 21 from PC 20 where it is printed.

In this example, a relatively large printer file is prepared assuming that printer 21 is a printer which is supported by host server 12, and assuming that host server 12 has the correct driver for printer 21. If the printer is not supported and/or the host server does not have the correct driver, then the print request will fail.

Figure 3:
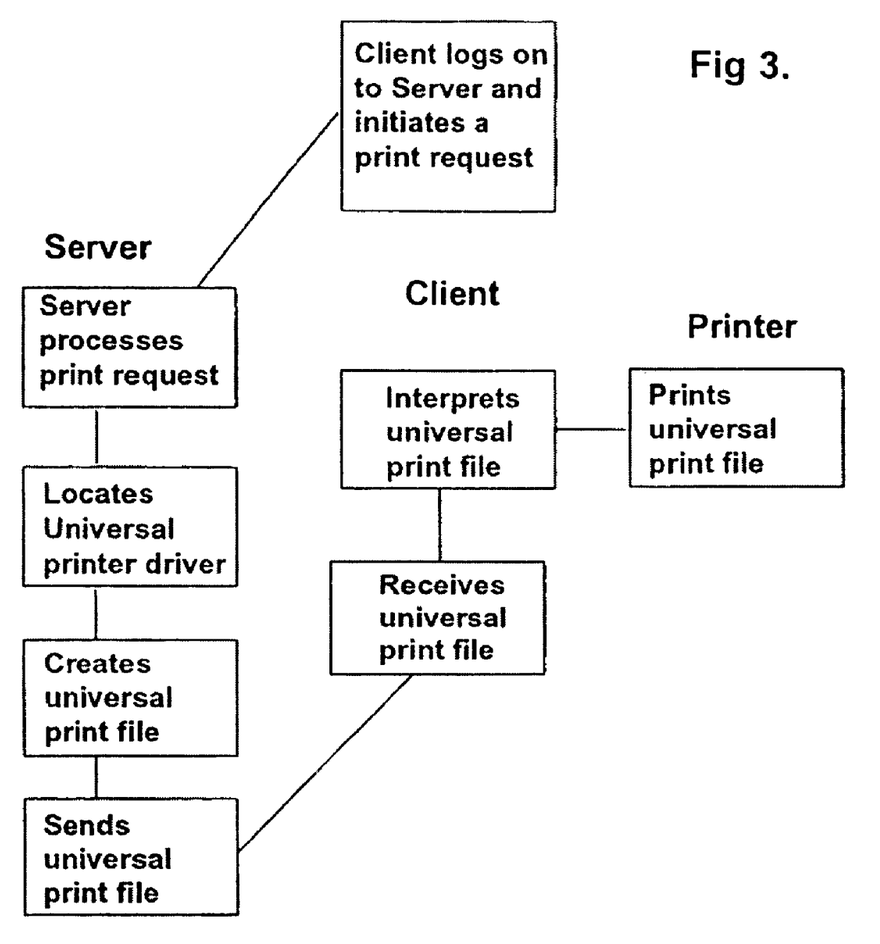
FIG. 3 is a flow chart of a print file being processed on a client-server computer system according to an embodiment of the present invention.

In FIG. 3 a similar flow chart is shown of a print file being processed on a client-server computer system according to the present invention. Using the same desktop computer 20, the user makes a request for a file to be printed. Host server 12 receives the print request and uses a universal printer driver to prepare a universal print file for transmission to PC 20 over network connection 14. In this case, the universal printer driver creates a compressed, transmittable printer file having a "pdf" format. The universal print file for the same 15 page document is now 68 KB in size, and takes far less time to be transferred to PC 20. Once the universal print file is received, the user at PC 20 can optionally preview the document and can select the desired printer. The universal printer file reader will then interpret the universal print file, and PC 20 will then forward the universal print file to printer 21 where it is printed.

As is seen, using this approach results in a much smaller file being transferred over network 14, so that the time for transfer is reduced. Also, the host server 12 no longer needs to identify or support printer 21, and does not even need to know which type of printer is to be selected. Host server 12 now merely uses the universal printer driver to create a universal print file. Accordingly, the number of printer drivers stored on the host server 12 is greatly reduced. The remote PC 20 is now used to merely forward the universal print file to the printer 21.

Similar flow charts would be used for any of the remote PC systems shown in FIG. 1, namely PCs 30, 40, 50 and 60, whether connected through the LAN 14, the WAN 15 or the Internet 16, when printing on printers 31, 41, 51, and 61 respectively.

Figure 4:
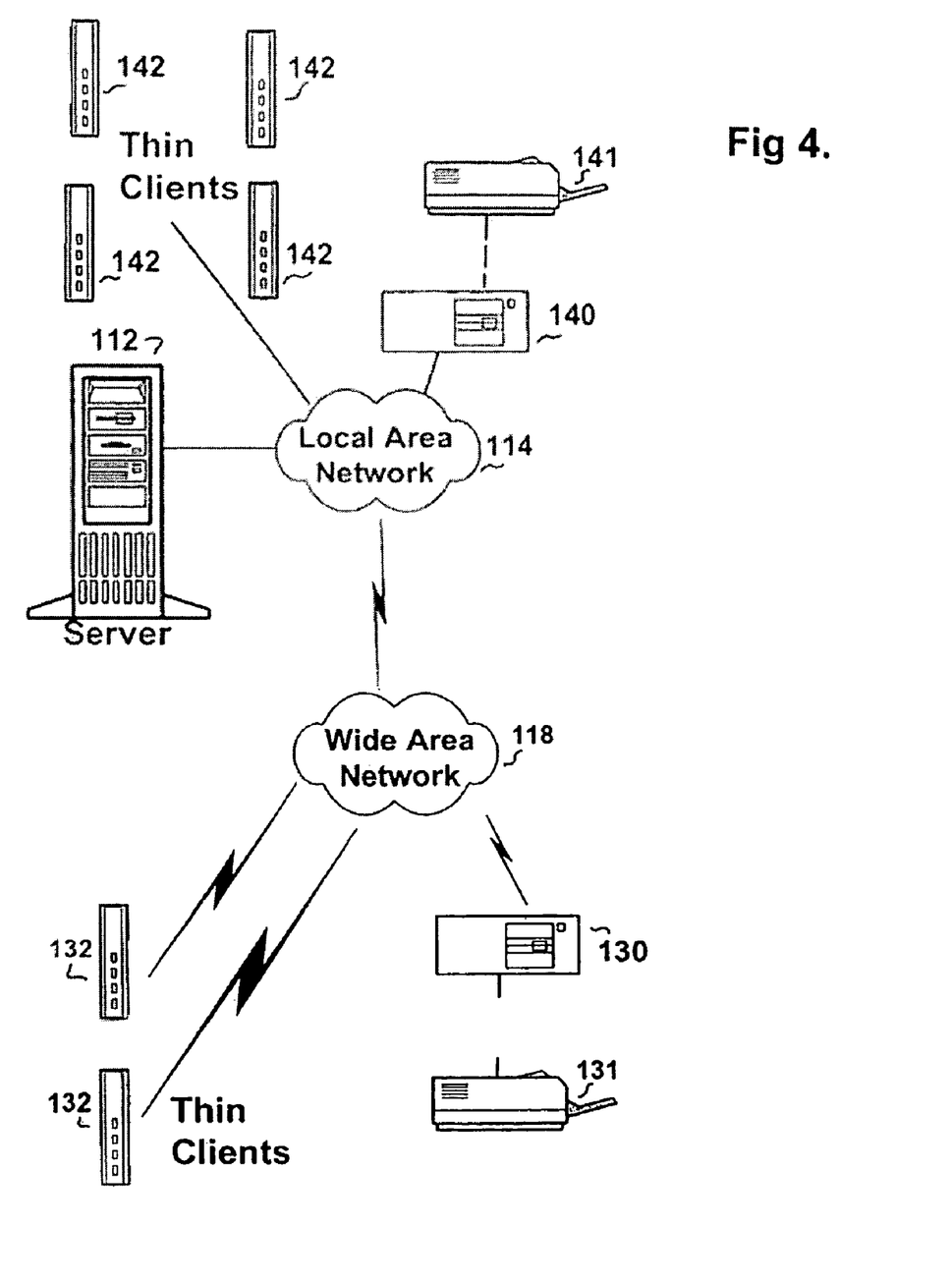
FIG. 4 is a alternative arrangement for a client-server computer system according to an embodiment of the present invention.

In FIG. 4 an alternative arrangement for a client-server computer system according to the present invention is shown. In FIG. 4, a host server 112 is connected via a LAN 114 to a number of thin client terminals, generally designated as 142. Connected to LAN 114 is a printer server 140, to which is connected printer 141. Also connected to LAN 114 is a WAN 118 to which is connected a series of thin client terminals, of which two are shown, and generally designated as 132. Also connected to WAN 118 is a printer server 130 to which is connected printer 131.

In this embodiment, when a user on a thin client terminal (either 132 or 142) makes a print request, the request is sent to host server 112. Host server 112 uses a universal printer driver to prepare a universal print file. Depending on the printer selected, the universal print file is forwarded to either printer server 130 or printer server 140, from which the universal print file is forwarded to printer 131 or 141 where the file is printed.

Again, in this embodiment, a smaller, compressed universal print file is transmitted over the LAN or WAN rather than the larger printer file. Also, the host server does not need to support the remote printers or have the printer drivers for all of the remote printers which might be used.

Also, it should be noted that it is not necessary for the user's computer to be attached to dedicated printer PC 140. This can be of convenience if the user's computer is a laptop or a hand held PDA, for example, and thus might be removed from its normal printer connection. Additionally, this would allow a wireless connection to the Internet to be used from a mobile PC or PDA which would still allow for printing at a remote printer.

Figure 5:
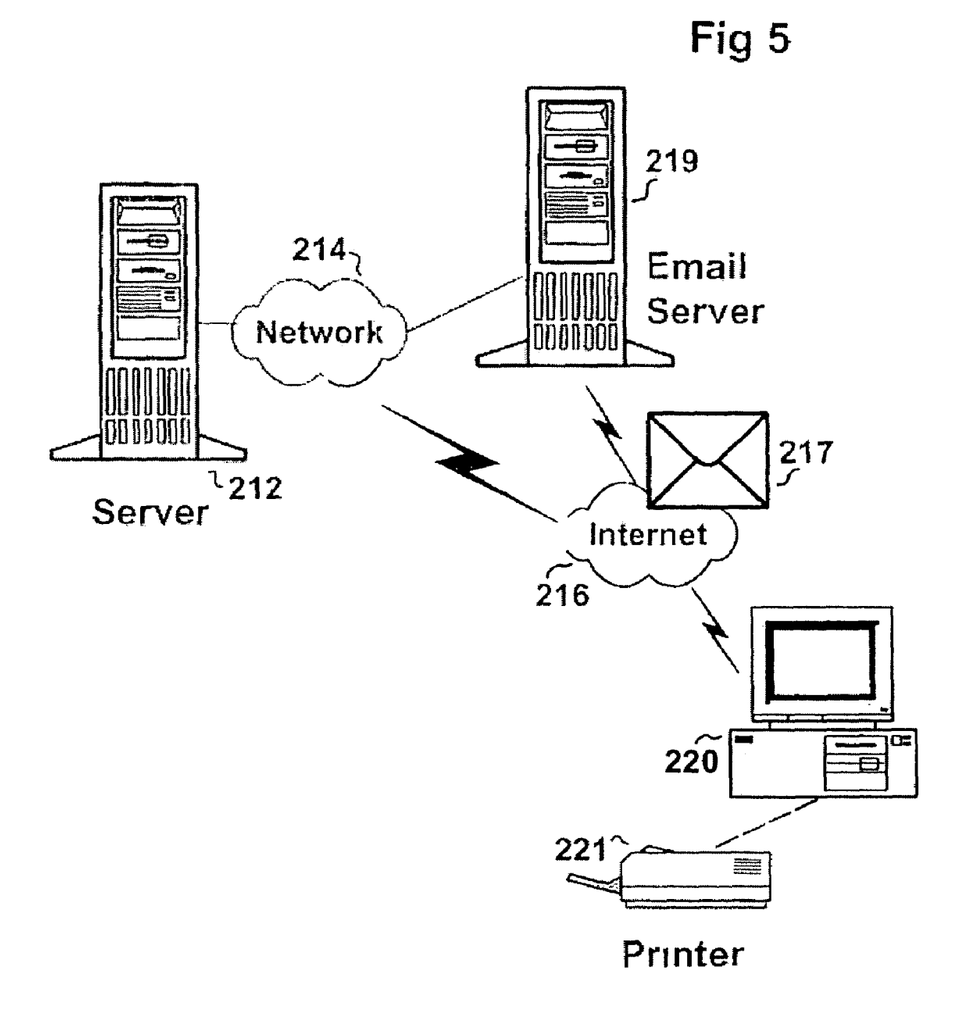
FIG. 5 is a further alternative arrangement for a client-server computer system according to an embodiment of the present invention.

In FIG. 5 a further alternative arrangement for a client-server computer system according to the present invention is shown. This arrangement includes an e-mail server 219 connected to host server 212 through a network 214.

In this embodiment, a print request to the host server 212 from a remote user on PC 220 is received through network 214. In this example, however, the "print job" is to be sent as an e-mail attachment. Host server 212 uses a universal printer driver to create a universal print file with a "pdf" format which is sent through network 214 to e-mail server 219. E-mail server 219 creates an e-mail message 217 which is sent via the Internet 216 to PC 220, where it is received and stored. The universal print file can then be printed at any convenient time on printer 221.

In this fashion, a standard e-mail message can be sent to any party selected by the user, and not just by the user of PC 220, for them to print a universally accepted file on their own printers.

Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps.

What is claimed is:

1. A server for connection to a client via a network; said client operable to transmit user-input to said server over said network and to receive user-output from said server over said network; said server comprising:

a network interface for connection to said network;

a processor coupled to said interface; said processor operable to remotely host execution of an application for said client; said application for receiving said user-input from said client over said network and for generating said user-output for transmission to said client over said network; said processor further operable to generate a universal printer file from said application based on a print request embedded in said user-input; said processor further operable to transmit said universal printer file to an electronic mail system for delivery of the universal printer file to a destination specified by said client.

2. The server defined in claim 1, wherein delivery of the universal printer file to the destination comprises delivery of the universal printer file as an attachment to an email message.

3. The server defined in claim 1, wherein said universal printer file is generated according to the Adobe Acrobat portable document format ("PDF").

4. The server defined in claim 1, wherein said network includes at least one of a local area network; a wide area network and the Internet.

5. The server defined in claim 1, wherein said universal printer file is transmitted to said destination for printing at a printer locally connected to said destination; said destination operable to interpret said universal printer file for said printer via a universal print file reader in cooperation with a local printer driver complementary to said printer.

6. The server defined in claim 5, wherein said universal printer file is generated according to the Adobe Acrobat portable document format ("PDF").

7. The server defined in claim 6, wherein said universal print file reader is Adobe Acrobat Reader.

8. A client-server computer system comprising:
a client operable to transmit user-input over a network and to receive user-output over said network;
a server connected to said client via said network; said server operable to remotely host execution of an application for said client; said application for receiving said user-input from said client over said network and for generating said user-output for transmission to said client over said network; said server further operable to: (I) generate a universal printer file from said application based on a print request embedded in said user-input and; (II) communicate with an electronic mail system for delivery of the universal printer file to a destination specified by said client;
said destination operable to receive said universal printer file; said destination including:
a universal print file reader operable to interpret said universal printer file into a local printer file in cooperation with a local printer driver; and
a printer complementary to said local printer driver for connection to said destination, said printer operable to print a document from said local printer file.

9. The system defined in claim 8, wherein delivery of the universal printer file to the destination comprises delivery of the universal printer file as an attachment to an email message.

10. The system defined in claim 8, wherein the print request is transmitted over a wireless connection.

11. The system defined in claim 8, wherein said client is said destination.

12. The system defined in claim 8, wherein said universal printer file is generated according to the Adobe Acrobat portable document format ("PDF").

13. The system defined in claim 8, wherein said network includes at least one of a local area network; a wide area network and the Internet.

14. The system defined in claim 8, said server being a host server, the system further comprising an email server connected to said host server, said email server operable to accept the universal printer file from said host server and to transmit an email message containing said universal printer file to the destination.

15. A method of printing, comprising:
receiving a print request at a server from a client remotely connected to said server via a network;
processing said print request at said server by corresponding said print request to an application hosted on said server on behalf of said client;
locating a universal printer driver on said server;
creating a universal printer file from said application using said universal printer driver; and
sending an email message containing said universal printer file to a destination specified by said client.

16. The method defined in claim 15, wherein said universal printer file is generated according to the Adobe Acrobat portable document format ("PDF").

17. The method defined in claim 15, wherein said network includes at least one of a local area network; a wide area network and the Internet.

18. The method defined in claim 15, wherein said sending step includes transmitting said universal printer file to said destination and said method further includes the steps of:
receiving said universal printer file at said destination;
interpreting said universal printer file for a printer in communication with said destination;
printing said interpreted universal printer file at said printer.

19. The method defined in claim 18, wherein said destination is said client.

20. The method defined in claim 15, wherein said universal printer file is generated according to the Adobe Acrobat portable document format ("PDF").

21. The method defined in claim 15, wherein said sending step includes transmitting said universal printer file to an e-mail server, and said method further comprises the steps of:
creating the e-mail message at said e-mail server;
attaching said universal printer file to said e-mail message;
transmitting said e-mail message and attached universal printer file from the e-mail server to said destination.

* * * * *